United States Patent
Kryvobok

(10) Patent No.: US 11,573,305 B2
(45) Date of Patent: Feb. 7, 2023

(54) DIRECTION AND DOPPLER SHIFT IN RANGING SYSTEMS AND METHODS

(71) Applicant: FLIR Systems Trading Belgium BVBA, Meer (BE)

(72) Inventor: Artem Kryvobok, Marke (BE)

(73) Assignee: FLIR Systems Trading Belgium BVBA, Meer (BE)

( * ) Notice: Subject to any disclaimer, the term of this patent is extended or adjusted under 35 U.S.C. 154(b) by 620 days.

(21) Appl. No.: 16/686,391

(22) Filed: Nov. 18, 2019

(65) Prior Publication Data
US 2021/0255293 A1 Aug. 19, 2021

Related U.S. Application Data

(60) Provisional application No. 62/774,429, filed on Dec. 3, 2018.

(51) Int. Cl.
*G01S 7/4911* (2020.01)
*G01S 7/481* (2006.01)
(Continued)

(52) U.S. Cl.
CPC ........... *G01S 7/4911* (2013.01); *G01S 7/4814* (2013.01); *G01S 7/4815* (2013.01); *G01S 7/4817* (2013.01); *G01S 7/51* (2013.01); *G01S 17/58* (2013.01)

(58) Field of Classification Search
CPC .......... G01S 17/34; G01S 17/58; G01S 17/87; G01S 7/4814; G01S 7/4815; G01S 7/4817; G01S 7/4911; G01S 7/51
(Continued)

(56) References Cited

U.S. PATENT DOCUMENTS 3,711,822 A * 1/1973 Muller ................. G01S 13/585
367/90
3,882,500 A * 5/1975 Sikora ..................... G01S 13/68
342/78
(Continued)

FOREIGN PATENT DOCUMENTS

FR 2973885 5/2013
JP 2010127840 6/2010

OTHER PUBLICATIONS

Peter Andany et al., "Chirped Lidar Using Simplified Homodyne Detection", Journal of Lightwave Technology, vol. 27, No. 16, Aug. 15, 2009, pp. 3351-3357.
(Continued)

*Primary Examiner* — Samantha K Nickerson
(74) *Attorney, Agent, or Firm* — Haynes and Boone, LLP

(57) ABSTRACT

Techniques are disclosed for systems and methods to provide accurate and reliable target information when there is relative motion between a remote sensing system and the target. A remote sensing system includes a multichannel ranging sensor assembly and a controller. The ranging sensor assembly includes multiple sensor channels configured to emit modulated sensor beams towards a target and to detect corresponding reflected beams reflected from the target, where the modulated sensor beams are selected to be correlated to each other and mutually incoherent with respect to each other. The controller is configured to receive reflected beam sensor signals corresponding to the detected reflected beams, to determine Doppler components associated with the reflected beams based, at least in part, on the first and second reflected beam sensor signals, and to generate target information based, at least in part, on the determined Doppler components.

20 Claims, 3 Drawing Sheets

(51) Int. Cl.
*G01S 17/58* (2006.01)
*G01S 7/51* (2006.01)

(58) Field of Classification Search
USPC ........................................................ 356/5.09
See application file for complete search history.

(56) References Cited

U.S. PATENT DOCUMENTS

| | | | | |
|---|---|---|---|---|
| 5,327,216 | A * | 7/1994 | Berni | G01V 1/22 |
| | | | | 356/486 |
| 5,410,314 | A * | 4/1995 | Frush | G01S 13/003 |
| | | | | 342/104 |
| 5,469,169 | A * | 11/1995 | Frush | G01S 13/951 |
| | | | | 342/460 |
| 5,471,211 | A * | 11/1995 | Randall | G01S 13/951 |
| | | | | 342/460 |
| 6,603,536 | B1 * | 8/2003 | Hasson | G01S 7/487 |
| | | | | 356/28.5 |
| 2009/0073417 | A1 * | 3/2009 | Urata | G01S 7/484 |
| | | | | 356/28.5 |
| 2010/0294917 | A1 * | 11/2010 | Morgan | G01P 5/001 |
| | | | | 250/214 R |
| 2014/0139818 | A1 | 5/2014 | Sebastian et al. | |
| 2014/0300884 | A1 | 10/2014 | Sebastian et al. | |
| 2014/0376001 | A1 * | 12/2014 | Swanson | G01N 21/17 |
| | | | | 356/479 |
| 2017/0299711 | A1 * | 10/2017 | Kishigami | G01S 13/5242 |
| 2021/0255293 | A1 * | 8/2021 | Kryvobok | G01S 7/4815 |

OTHER PUBLICATIONS

Markus-Christian Amann et al., "Laser ranging: a critical review of usual techniques for distance measurement", 2001 Society of Photo-Optical Instrumentation Engineers, Jul. 24, 2000, vol. 40, No. 1, pp. 10-19.

Rosemary Diaz et al., "Lidar detection using a dual-frequency source", Optics Letters, vol. 31, No. 24, Dec. 15, 2006, 2006 Optical Society of America, 3 pages.

Diego Pierrotteta et al., "Linear FMCW Laser Radar for Precision Range and Vector Velocity Measurements", Nasa Langley Research Center, 2008, 9 pages.

H.W. Presley et al., "Accousto-Optic Beam Steering Study", Harris Corporation, Final Technical Report, Aug. 1994, 142 pages.

Marc Vallet et al., "Lidar-radar velocimetry using a pulse-to-pulse coherent rf-modulated Q-switched laser", Applied Optics, Optical Society of America, 2013, vol. 52, No. 22, pp. 5402-5410.

* cited by examiner

DIRECTION AND DOPPLER SHIFT IN RANGING SYSTEMS AND METHODS

CROSS REFERENCE TO RELATED APPLICATIONS

This application claims the benefit of and priority to U.S. Provisional Patent Application No. 62/774,429 filed Dec. 3, 2018 and entitled "DIRECTION AND DOPPLER SHIFT IN RANGING SYSTEMS AND METHODS," which is incorporated herein by reference in its entirety.

This application is related to U.S. Provisional Patent Application No. 62/612,286 filed Dec. 29, 2017 and entitled "DIRECTION AND DOPPLER SHIFT IN RANGING SYSTEMS AND METHODS," which is incorporated herein by reference in its entirety.

TECHNICAL FIELD

One or more embodiments of the present disclosure relate generally to remote sensing and ranging systems, and more particularly, for example, to determining direction and Doppler shift with respect to a target using frequency modulated continuous wave (FMCW) ranging systems.

BACKGROUND

Remote sensing systems, such as LADAR, LiDAR, radar, and/or other ranging systems, are often used to detect targets (e.g., tactical objects, geographical features, weather formations, and/or other types of targets) in proximity to a particular area, such as that associated with a fixed or a mobile structure. Conventional remote sensing systems typically suffer from a variety of measurement uncertainties and errors that reduce the reliability of resulting target information (e.g., range and direction to the target). One source of such inaccuracies are Doppler shifts in the sensing signal caused by motion of the sensing system and/or the target during a measurement. Measurement inaccuracies related to such Doppler shifts can propagate throughout the associated signal processing and target analysis and produce target information that is difficult to interpret reliably and that increases the risk of a user misapprehending an actual tactical or positional situation. Thus, there is a need for improved methodologies to provide highly accurate and reliable remote sensing of targets, particularly when a remote sensing system and an observed target are in motion relative to one another.

SUMMARY

Techniques are disclosed for systems and methods to provide accurate and reliable range sensing when there is relative motion between a remote sensing system and a target sensed by the remote sensing system. The remote sensing system may include one or more ranging sensor assemblies each implemented as laser detection and ranging (LADAR) assemblies, light detection and ranging (LiDAR) assemblies, and/or other ranging sensor assemblies, for example, that may be configured to leverage frequency-modulated continuous wave (FMCW) techniques and that may each be implemented with one or more sensor channels, as described more fully herein.

A remote sensing system may include one or more controllers configured to communicate with the ranging sensor assemblies, various user interfaces, and/or other system modules. Each ranging sensor assembly may be adapted to be mounted to a mobile and/or a fixed structure, and such mounting may be fixed or articulated (e.g., actuated to control an orientation of the ranging sensor assembly). Each controller may be configured to receive reflected beam sensor signals from the ranging sensor assemblies, compare the received reflected beam sensor signals, identify and remove Doppler components from the received reflected beam sensor signals, and generate target information, such as target range, target direction, related positional coordinates, and imagery, for example, based on the compared reflected beam sensor signals and/or the associated Doppler components. Target information may be displayed to a user via a display of a user interface, for example, and/or may be provided to a controller and/or other elements of a remote sensing system to determine target orientation, to adjust ranging sensor assembly orientation, for further processing, and/or for otherwise adjusting or facilitating operation of the remote sensing system. Resulting Doppler corrected target information provides improved target selection, identification, and/or other target processing, statistics, and/or other remote sensing system characteristics, particularly when the target and the remote sensing system are in motion relative to one another.

In one embodiment, a remote sensing system may include a ranging sensor assembly and a controller configured to communicate with the ranging sensor assembly. The ranging sensor assembly may include first and second sensor channels configured to emit respective first and second modulated sensor beams towards a target and to detect corresponding respective first and second reflected beams reflected from the target, where the first and second modulated sensor beams are selected to be correlated to each other and mutually incoherent with respect to each other. The controller may be configured to receive first and second reflected beam sensor signals corresponding to the detected first and second reflected beams, to determine Doppler components associated with the first and second reflected beams based, at least in part, on the first and second reflected beam sensor signals, and to generate target information based, at least in part, on the determined Doppler components and/or the received first and second reflected beam sensor signals.

In various embodiments, a remote sensing system may include a user interface and/or a housing adapted to be mounted to a stationary or mobile structure. A ranging sensor assembly may be configured to emit first and second modulated sensor beams generated by a single sensor beam source (e.g., using beam splitter components and separate sets of beam manipulation components) or two or more sensor beam sources (e.g., each with their own set of beam manipulation components), and the ranging sensor assembly may be articulated and/or include actuated mirrors and/or other mounts or components to facilitate emitting such beams towards a target. The controller may be configured to generate relatively accurate target information by identifying extracting Doppler components from the reflected beam sensor signals and by processing the Doppler components and/or the reflected beam sensor signals to determine the target information, which may include relative and/or absolute target position, angular direction to target, velocity and/or acceleration of target, range to target, cross sectional area and/or centroid of target, target orientation (e.g., relative to other targets, the horizon, and/or its velocity) and/or associated imagery (e.g., plotted target characteristics on a chart and/or over time). For example, a user interface of the remote sensing system may be configured to receive and display such target information.

In another embodiment, a method may include receiving, from a ranging sensor assembly comprising first and second sensor channels configured to emit respective first and second modulated sensor beams towards a target and to detect corresponding respective first and second reflected beams reflected from the target, first and second reflected beam sensor signals corresponding to the first and second reflected beams reflected from the target, determining Doppler components associated with the first and second reflected beams based, at least in part, on the first and second reflected beam sensor signals, and generating target information based, at least in part, on the Doppler components and/or the received first and second reflected beam sensor signals. The first and second modulated sensor beams may be selected to be correlated to each other and mutually incoherent with respect to each other. In various embodiments, such method may include receiving the reflected beam sensor signals from a ranging sensor assembly mounted to a fixed or mobile structure and/or displaying resulting target information via a user interface.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
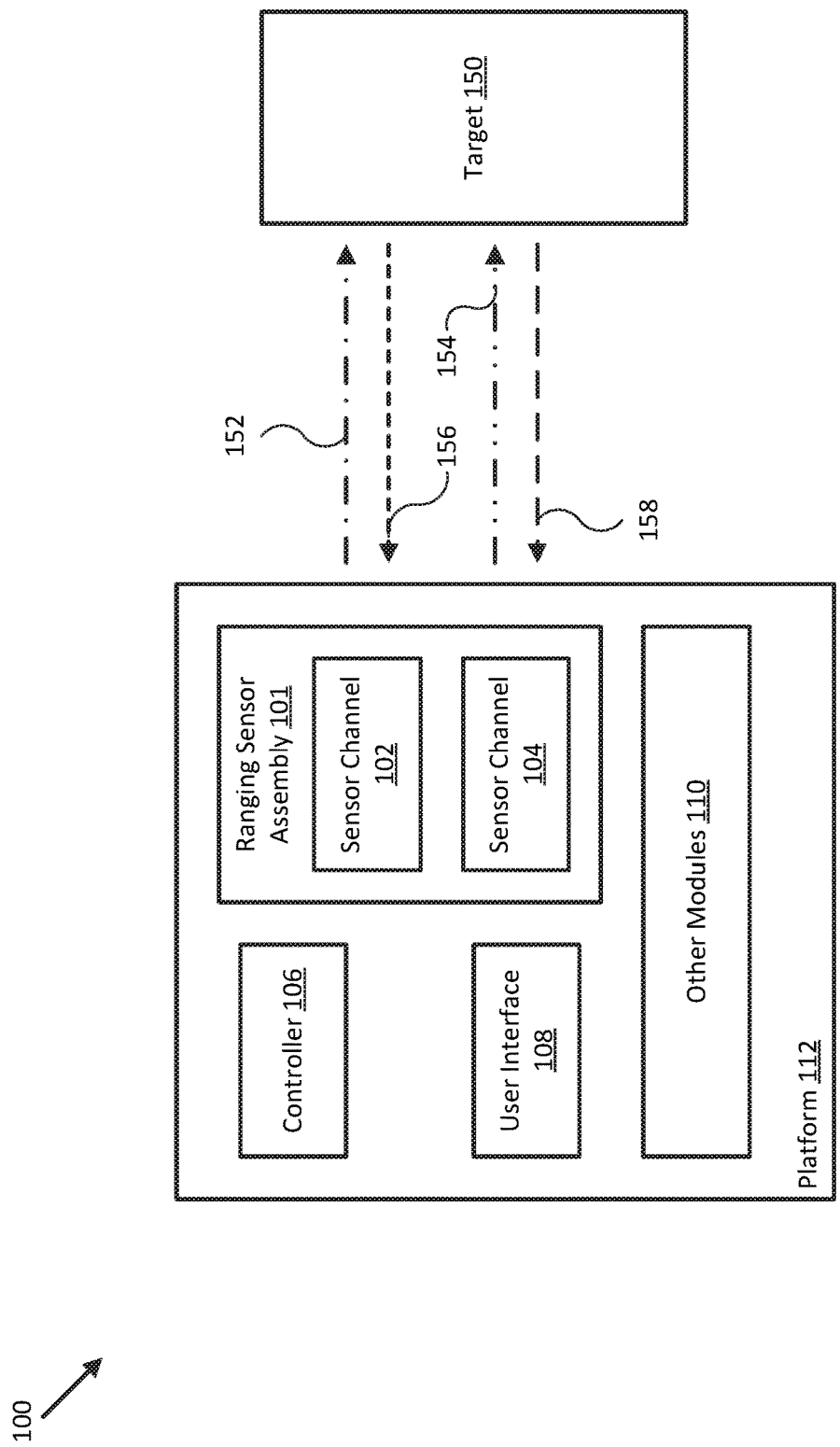
FIG. 1 illustrates a block diagram of a remote sensing system, in accordance with an embodiment of the present disclosure.

In accordance with various embodiments of the present disclosure, a remote sensing system may include, one or more ranging sensor assemblies each configured to use at least dual purposefully differentiated sensor beams to generate corresponding at least dual reflected beam sensor signals and provide such reflected beam sensor signals to one or more controllers for processing. The one or more controllers of the remote sensing system may be configured to use the known differences between the sensor beams and the corresponding reflected beam sensor signals to accurately and reliably determine Doppler components associated with the reflected beams.

Such Doppler components may be used, in conjunction with the reflected beam sensor signals, to generate relatively reliable and accurate target information, as described herein, such as relative and/or absolute target position or coordinates, angular direction to target, velocity and/or acceleration of target, range to target, cross sectional area, shape, and/or centroid of target, target orientation (e.g., relative to other targets, the horizon, and/or its velocity) and/or associated imagery (e.g., plotted target characteristics on a chart and/or over time). Such target information, generated by embodiments described herein, is more accurate and reliable than that provided by conventional systems and, as a result, is more easily and reliably interpretable by users.

In conventional remote sensing systems, inaccuracies in target information can result from Doppler shift when there is relative motion between a ranging sensor and an observed target. For example, the emitted beam bandwidth may not be known precisely (e.g., due to thermal effects, applied modulations, and/or other long or short term bandwidth artifacts), and a Doppler shifted bandwidth component may be present in the bandwidth of a corresponding reflected beam detected by a detector of the ranging sensor. Because the reflected beam includes both the emitted bandwidth and the Doppler shifted bandwidth, determining the Doppler contribution accurately can be difficult or impossible with such conventional remote sensing systems.

To illustrate, if the bandwidth of the reflected beam is 10 Hz, the reflected beam could include an 8 Hz emitted bandwidth component and a 2 Hz Doppler shifted bandwidth component, or the reflected beam could include a 6 Hz emitted bandwidth component and a 4 Hz Doppler shifted bandwidth component. The unknown relative contribution of the Doppler component to the reflected beam bandwidth can therefore severely limit the accuracy and reliability of the remote sensing system by allowing uncertainty to exist as to the relative contributions to the measured bandwidth of the reflected beam. Uncertainty in the Doppler component propagates throughout the target information and can result in substantial errors in target range, target direction, target velocity, target size, and/or other target information, particularly when the target is near the maximum detection range of the ranging sensor and/or when the ranging sensor and/or the target are moving at high speeds relative to one another.

FIG. 1 illustrates a block diagram of a remote sensing system 100 in accordance with an embodiment of the disclosure. In FIG. 1, system 100 includes a ranging sensor assembly 101 including a plurality of sensor channels 102, 104, a controller 106, an interface 108, and other modules 110, configured for use on a platform 112. Ranging sensor assembly 101 may be configured to emit at least first and second modulated sensor beams 152 and 154 towards a target 150 and to receive corresponding respective first and second reflected beams 156 and 158 reflected from target 150, as shown. Platform 112 may correspond to a fixed structure (e.g., a building, a stop light pole, and/or other fixed structure) or a mobile structure (e.g., a drone or UAV, a watercraft, aircraft, motor vehicle, and/or other mobile structure, including a portable housing), and system 100 may be used for a variety of applications, such as land, air, or sea navigation, military or law enforcement monitoring, general surveillance, and/or other applications. In one embodiment, system 100 may be implemented as a relatively compact portable unit that may be conveniently installed, operated, and/or handheld by a user (e.g., a user of platform 112).

In general embodiments, ranging sensor assembly 101 (e.g., a multiple channel LADAR and/or LiDAR sensor assembly) may be mounted to or within a mobile structure, may be mounted on a fixed structure, or may be handheld, for example, and sensor channels 102 and 104 of ranging sensor assembly 101 may be mounted together or across a variety of different installations and/or mobile platforms (e.g., to form a distributed remote sensing system 100 and/or ranging sensor assembly 101). In some embodiments, controller 106, user interface 108, and/or other elements of remote sensing system 100 may be disposed across platforms different from platform 112 and different from the platform(s) supporting remote sensor assembly 101.

Although FIG. 1 shows various elements of system 100 as separate from each other, in other embodiments, any one or combination of the elements may be integrated with each other and/or other elements of system 100. For example, sensor channels 102 and 104, controller 106, and/or user interface 108 may be integrated as a single unit mounted to or within platform 112 and be configured to provide various target information about an observed target, such as range or distance to target, direction to target, target position (e.g., absolute or relative target position), relative or absolute target velocity, corresponding imagery, and/or other target information, as described herein.

In some embodiments, system 100 may be adapted to provide sensor information and/or imagery (e.g., target information) for a particular type of platform 112, such as a drone, a watercraft, an aircraft, a robot, a motor vehicle, and/or other types of mobile structures, including any platform designed to move through or under the water, through the air, on a terrestrial surface, and/or held by a user. System 100 may display imagery or other target information to a user via user interface 108 and/or allow the user or controller 106 (e.g., implemented as an autopilot, a target tracking mechanism, and/or other type of platform controller) to use resulting imagery and/or other target information to control operation of platform 112, such as controlling steering actuators and/or propulsion systems to pilot or orient platform 112 according to a desired heading or heading angle, for example, when moving through or under water or air or on a terrestrial surface.

System 100 may be used for many different types of applications. In one example, law enforcement agencies may use system 100 to obtain accurate speed, position, and direction information of targets (e.g., vehicles) moving toward/away from an intersection. In another example, aerospace surveillance installations may use system 100 to obtain highly detailed and accurate information and/or imagery of aircraft and spacecraft, either as part of the generated target information, or by using such target information to orient other sensors (e.g., optical cameras) towards an observed target.

In some embodiments, elements of system 100 may be consolidated into a single package, which may be waterproof, to reduce size and manufacturing costs and improve reliability, for example, and may be implemented with a connection (e.g., via an Ethernet cable with power over Ethernet, an integral power cable, and/or other communication and/or power transmission conduits integrated into a single interface cable) for communication with other devices or systems. In various embodiments, system 100 may be implemented with a single ranging sensor assembly housing (e.g., platform 112) incorporating two different beam sources and/or associated electronics for sensor channels 102 and 104, as described herein. In other embodiments, system 100 may be implemented with two separate ranging sensor assembly housings with each housing incorporating one beam source and/or associated electronics (e.g., a single sensor channel).

Ranging sensor assembly 101 may be implemented with one or more electrically and/or mechanically coupled controllers, transmitters, receivers, transceivers, signal processing logic devices, various optical components, various electrical components, assembly brackets, and/or various actuators adapted to adjust orientations of any of the components of ranging sensor assembly 101 and/or sensor channels 102 and 104. Ranging sensor assembly 101 and/or sensor channels 102 and 104 may be mounted on or within platform 112 in a fixed manner, for example, or may be mounted to move in a scanning or rotating motion or any other desired or appropriate motion associated with a particular application. In particular, sensor channels 102 and 104 may be collocated on platform 112 or may be located on different platforms.

More generally, during operation, sensor channels 102 and 104 may each be configured to emit one, multiple, or a series of modulated sensor beams 152 and 154 toward a target and to receive corresponding reflected beams 156 and 158. In various embodiments, modulated beams 152 emitted by sensor channel 102 may be selected (e.g., by user input and/or controller 106) to have wavelengths and/or other beam characteristics different from those emitted by sensor channel 104. Sensor channels 102 and 104 may be configured to provide corresponding reflected beam sensor signals to controller 106, which may itself be configured to convert the reflected beam sensor signals into relatively reliable and accurate target information, as described more fully herein. The target information may be provided to user interface 108 for display to a user, for example, or may be processed by controller 106 to help control operation of platform 112. In some embodiments, the target imagery and/or other target information can be used to control movement (e.g., aligning, rotating, or scanning) of ranging sensor assembly 101 and/or sensor channels 102 and 104, individually or in combination, such as to track an observed target.

User interface 108 may be implemented as a display, a touch screen, a keyboard, a mouse, a joystick, a knob, one or more buttons, a speaker or microphone, and/or any other device capable of accepting user input and/or providing feedback to a user. User interface 108 may be configured to provide many different display views from a variety of selectable perspectives, including chart view imaging, intensity plot imaging, and/or three dimensional imaging, for example, according to different configurations and/or processing methods (e.g., as selected by a user).

User interface 108 may be adapted to provide user input (e.g., as a type of signal and/or sensor information) to other devices of system 100, such as controller 106. User interface 108 may also be implemented with one or more controllers that may be adapted to execute instructions, such as software instructions implementing any of the various processes and/or methods described herein. For example, user interface 108 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations on sensor information, for example, or to perform various other processes and/or methods.

In various embodiments, user interface 108 may be adapted to accept user input to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 108 accepts a user input, the user input may be, transmitted to other devices of system 100 over one or more communication links.

Controller 106 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of system 100. Such software instructions may also implement methods for processing sensor signals, determining sensor information, providing user feedback (e.g., through user interface 108), querying devices for operational parameters, selecting operational parameters for devices, or performing any of the various operations described herein (e.g., operations performed by logic devices of various elements of system 100).

In addition, a non-transitory medium (e.g., integrated with controller 106, or implemented as other modules 110) may be provided for storing machine readable instructions for loading into and execution by controller 106. In these and other embodiments, controller 106 may be implemented with other components where appropriate, such as volatile memory, non-volatile memory, one or more interfaces, and/or various analog and/or digital components for interfacing with devices of system 100. For example, controller 106 may be adapted to store target information, sensor signals, sensor information, parameters for coordinate frame transformations, calibration parameters, sets of calibration points, and/or other operational parameters, over time, for example, and provide such stored data to a user using user interface 108. In some embodiments, controller 106 may be integrated with one or more user interfaces (e.g., user interface 108), and, in one embodiment, may share a communication module or modules (e.g., other modules 110). As noted herein, controller 106 may be adapted to execute one or more control loops for actuated device control, steering control and/or performing other various operations of platform 112 and/or system 100. In some embodiments, a control loop may include processing sensor signals and/or sensor information in order to control one or more operations of system 100.

As shown in FIG. 1, system 100 may in some embodiments be implemented with one or more other modules 110. Other modules 110 may include one or more other and/or additional sensors, actuators, communications modules/nodes, memory storage devices, and/or user interface devices that may be used to facilitate operation of system 100, for example. In some embodiments, other modules 110 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 106) to provide operational control of platform 112 and/or system 100 that compensates for environmental conditions, such as wind speed and/or direction, swell speed, amplitude, and/or direction, and/or an object in a path of platform 112, for example.

Other modules 110 may also include orientation and/or position sensors such as a gyroscope, accelerometer, a global navigation satellite system (GNSS) receiver, an orientation sensor (e.g., a magnetometer, a float level, a compass, and/or other orientation sensing device adapted to measure the orientation and/or position of ranging sensor assembly 200 and/or platform 112), and/or a speed sensor to provide orientation and/or position information, such as three dimensional orientations and/or positions of platform 112, ranging sensor assembly 101, and/or sensor channels 102 and 104, for use when processing and/or post processing sensor signals (e.g., for display by user interface 108). Such position information can be used to correct for movement of platform 112, ranging sensor assembly 101, and/or sensor channels 102 and 104 between beam emissions and receptions to provide improved alignment of corresponding sensor signals imagery, and/or other target information, for example, and/or to generate imagery based, at least in part, on the measured orientations and/or positions of platform 112, ranging sensor assembly 101, and/or sensor channels 102 and 104.

Other modules 110 may also include one or more actuated devices (e.g., spotlights, infrared illuminators, cameras, radars, sonars, and/or other actuated devices) coupled to platform 112, where each actuated device includes one or more actuators adapted to adjust an orientation of the device, relative to platform 112, in response to one or more control signals (e.g., provided by controller 106). Other modules 110 may also include a rotating and/or articulated platform and/or corresponding actuators for ranging sensor assembly 101 and/or sensor channels 102 and 104 (e.g., controlled by controller 106).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor information and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Also, each of the elements of system 100 may be implemented with one or more amplifiers, modulators, phase adjusters, signal and/or beam forming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100, for example, or other devices or systems (e.g., a remote user interface). Such components may be integrated with a corresponding element of system 100, for example.

System 100 may include (e.g., as other modules 110) one or more batteries or other electrical power storage devices, for example, and/or one or more solar cells or other electrical power generating devices (e.g., a wind or water-powered turbine, or a generator producing electrical power from motion of one or more elements of system 100). In some embodiments, one or more elements of system 100 may be powered by a power source for platform 112, through corresponding power leads. Such power leads may also be used to support one or more communication techniques between various elements of system 100.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules (e.g., other modules 110) supporting wired, wireless, and/or a combination of wired and wireless communication techniques.

Various elements or portions of elements of system 100 may be integrated with each other, for example, or may be integrated onto a single printed circuit board (PCB), to reduce system complexity, manufacturing costs, power requirements, and/or timing errors between the various sensor measurements. For example, user interface 108, controller 106, ranging sensor assembly 101, and/or sensor channels 102 and 104 may be configured to share one or more components, such as a memory, a logic device, a communications module, and/or other components, and such sharing may act to reduce and/or substantially eliminate such timing errors while reducing overall system complexity and/or cost.

Figure 2:
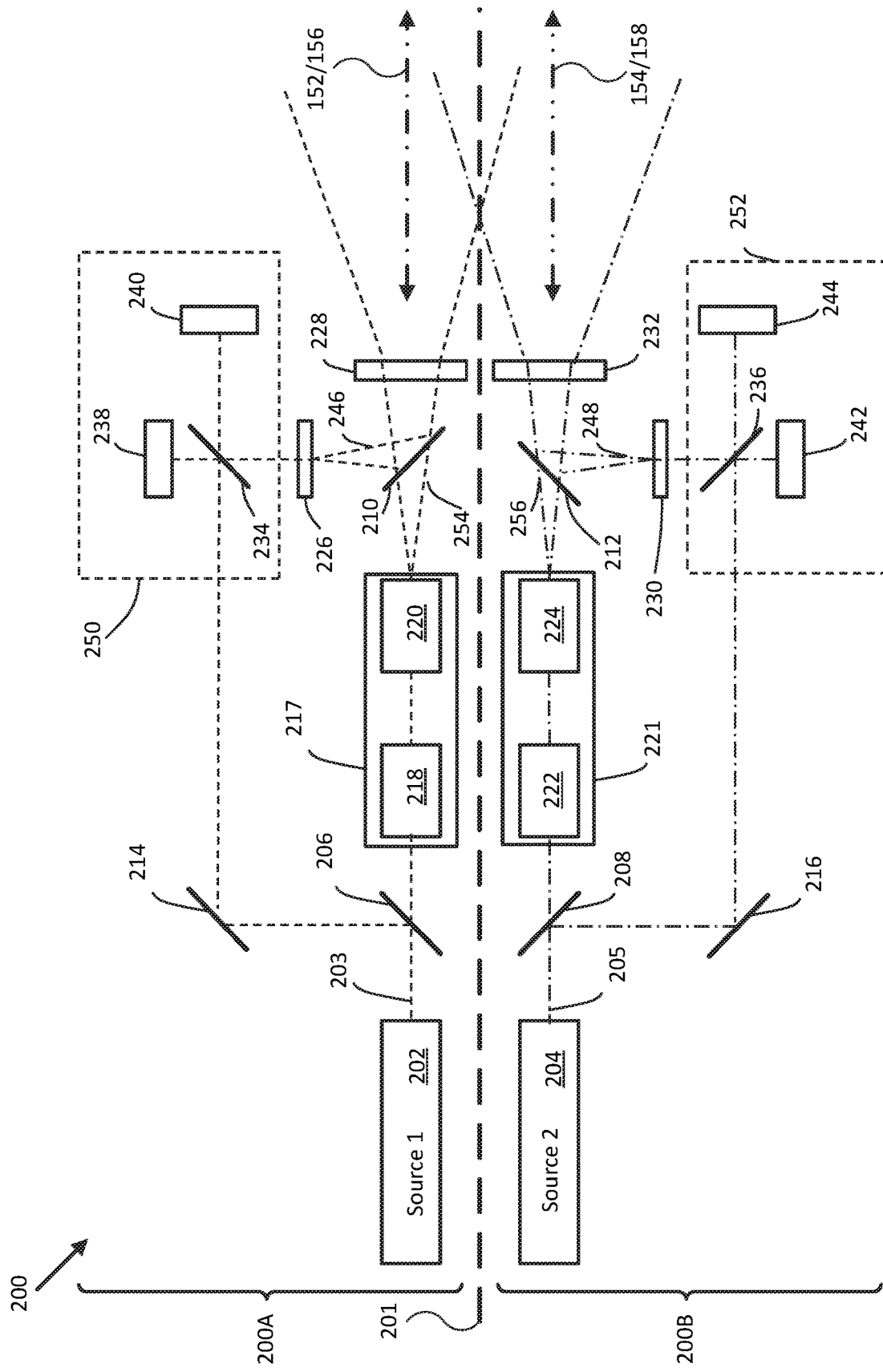
FIG. 2 illustrates a block diagram of a ranging sensor assembly, in accordance with an embodiment of the present disclosure.

FIG. 2 illustrates a block diagram of a ranging sensor assembly 200, in accordance with an embodiment of the present disclosure. In the embodiment shown in FIG. 2, ranging sensor assembly 200 is implemented with two sensor channels 200A and 200B (e.g., generally demarked above and below dashed line 201, and corresponding to sensor channels 102 and 104 of FIG. 1). Ranging sensor assembly 200 may be configured to emit or project multiple simultaneous beams (e.g., modulated sensor beams 152 and 154) of electromagnetic radiation towards a target (e.g., to illuminate the target), to receive corresponding reflected beams (e.g., reflected beams 156 and 158) reflected from the target, and to generate corresponding sensor signals based, at least in part, on the reflected beams. The sensor signals may be provided to controller 106, which may be configured to determine target information about the illuminated target, as described herein.

As shown in FIG. 2, ranging sensor assembly 200 may be implemented in a compact form to minimize the number of different elements of ranging sensor assembly 200. For example, in FIG. 2, ranging sensor assembly 200 may include beam sources 202 and 204, beam splitters 206 and 208, mirrors 210, 212, 214, and 216, modulator assemblies 217 and 221, detector assemblies 250 and 252, and optional optical elements 226, 228, 230, and 232. In some embodiments, various elements of ranging sensor assembly 200 (e.g., mirrors 214 and 216, elements of detector assemblies 250 and 252, optical elements 226, 228, 230, and 232) may be alternatively implemented with fiber optics, for example, to allow ranging sensor assembly 200 to be arranged differently or more compactly, which may in some embodiments include being arranged within a relatively compact single housing. Alternatively, ranging sensor assembly 200 may be implemented with multiple separate housings, such as one for each sensor channel 200A and 200B. In general, beam source 202 and corresponding elements (e.g., 206, 210, 214, 217, 226, 228, and 250) may be implemented as a first sensor channel 200A of ranging sensor assembly 200, and beam source 204 and corresponding elements (e.g., 208, 212, 216, 221, 230, 232, and 252) may be implemented as a second sensor channel 200B of ranging sensor assembly 200.

Beam sources 202 and 204 may be implemented with one or more lasers and/or other coherent beam sources, such as polarized gas lasers or solid state lasers. In various embodiments, beam sources 202 and 204 may be implemented as mutually incoherent beam sources (e.g., individually coherent beam sources that are not mutually coherent with each other, such that their generated beams do not substantially interfere with each other under the timing and/or other measurement constraints of detector modules 250 and 252 and/or of ranging sensor assembly 200). For example, beam sources 202 and 204 may be configured to or controlled to generate individually coherent reference beams 203 and 205 that are incoherent with respect to each other, such that they do not measurably interfere with each other (e.g., form an interference pattern and/or beat) on the temporal and spatial scales typical to an acquisition event measured by ranging sensor assembly 200.

More specifically, beam sources 202 and 204 may each be configured to generate individually or self-coherent reference beams 203 and 205, respectively, which may be characterized as each reference beam having a first order correlation function of $g_{First\,Beam}^{(1)} \approx 1$ and $g_{Second\,beam}^{(1)} \approx 1$, while being chaotic or uncorrelated relative to each other, which may be characterized as the two beams having a second order correlation function of their intensities of $g_{First\,beam,\,Second\,beam}^{(2)} \approx 2$ (e.g., each individual reference beam 203 and 205 is itself a coherent beam, but the reference beams are not mutually coherent with each other). Put generally in quantum mechanical terms, coherent beams 203 and 205, generated by coherent beam sources 202 and 204, may further be defined quantum mechanically as having states |First beam⟩ and |Second beam⟩ such that the modulus of their difference is: |First beam−Second beam|»1, and their overlap probability is approximately: |⟨First beam|Second beam⟩|²=exp(−|First beam−Second beam|²)≈0, i.e., the beams are very close to being orthogonal or incoherent with each other, and they are effectively orthogonal to each other when measured on the temporal and spatial scales typical to an acquisition event measured by ranging sensor assembly 200.

This mutual state of reference beams 203 and 205 is referred to herein as reference beams 203 and 205 being mutually incoherent with respect to each other, and this state can be selected by selecting appropriate beam sources and/or by controlling beam source(s) and/or other optical elements of ranging sensor assembly 200 to produce this state. Notably, and as described more fully herein, reference beams 203 and 205 may be modulated such that resulting modulated beams are mutually incoherent with respect to each other, even if the applied modulations are themselves correlated to each other (e.g., equivalent or functionally related to each other, as described herein). Such beams may be referred to herein as modulated sensor beams that are correlated to each other and mutually incoherent with respect to each other.

In various embodiments, beam sources 202 and 204 may be configured to produce reference beams 203 and 205 with different wavelengths λ1 and λ2, respectively. For example, beam sources 202 and 204 may be implemented as bichromatic laser sources configured to provide reference beam 203 with wavelength λ1 and reference beam 205 with wavelength λ2, where wavelengths λ1 and λ2 are the central or primary frequency of the beams output by beam sources 202 and 204. In some embodiments, beam sources 202 and 204 may be configured to provide reference beams having substantially red and green wavelengths. Such reference beams may be sufficiently powered and/or amplified to enable a specific application (e.g., according to a desired detection range and/or sensitivity in a particular environment, for example). In one embodiment, beam sources 202 and 204 may be implemented with a single coherent source configured to generate reference beam 203, a beam splitter configured to provide two beams of reference beam 203, and a frequency adjuster (e.g., multiplier, divider, modulator, and/or other frequency adjuster) configured to generate reference beam 205 from one beam of reference beam 203.

Modulator assemblies 217 and 221 may be configured to modulate reference beams 203 and 205, respectively, to facilitate determining various target information about a target illuminated by ranging sensor assembly 200. For example, in the embodiment shown in FIG. 2, modulator assemblies 217 and 221 may be at least partially synchronized (e.g., through control signals supplied by controller 106) such that a modulation applied to reference beam 203 by modulator assembly 217 is a function of, correlated with, and/or equivalent to a modulation applied to reference beam 205 by modulator assembly 221. In such embodiments, modulated sensor beams 254 and 256 emitted by respective modulator assemblies 217 and 221 (e.g., modulated sensor beams 152/154) may include correlated frequency components or modulations while maintaining the mutual incoherence of modulated sensor beams 254 and 256 inherited by mutually incoherent reference beams 203 and 205. For example, modulated sensor beams 254 and 256 may be correlated such that their respective modulations are a function of or equivalent to each other, as described herein. In various embodiments, modulator assemblies 217 and 221 may each include one or more modulators (e.g., modulators 218 and 220, and modulators 222 and 224), which may be individually synchronized with each other, as described herein. Such modulators may include electro-optical modulators, acousto-optical modulator, and/or other types of beam modulators.

As shown in FIG. 2, remote sensing assembly 200 may additionally include various optical elements to disperse, focus, split, collimate, and/or otherwise manipulate modulated sensor beams 254 and 256 and reflected beams 246 and 248 (e.g., reflected beams 156/158) in order to illuminate a target and deliver reflected beams 246 and 248 reflected by the target to detector modules 250 and 252.

In various embodiments, photodetectors 238 and 240 may be configured to form first detector module 250 and perform a first balanced homodyne detection associated with first source 202 and first reference beam 203, for example, and photodetectors 242 and 244 may be configured to form second detector module 252 and perform a second balanced homodyne detection associated with second source 204 and second reference beam 205. For example, photodetectors 238, 240, 242, and 244 of detector modules 250 and 252 may be configured to receive reflected beams 246 and 248 (e.g., corresponding to reflected beams 156/158), and provide reflected beam sensor signals, corresponding to the received reflected beams, to controller 106 for determining target information, and/or for further processing, for example. The reflected beam sensor signals may, for example, be voltage and/or current representations that correspond to energy (e.g., electromagnetic energy) of the reflected beams received by the detector modules, as shown. Moreover, detector modules 250 and 252 may be configured to receive respective reference beams 203 and 205, as shown, and the reflected beam sensor signals may be normalized or otherwise referenced to (e.g., balanced with) reference beams 203 and/or 205 as part of the balanced homodyne detection technique implemented by detector modules 250 and 252. Such techniques (e.g., including signal differencing) can help to remove common mode signals and/or noise, for example. Notably, in some embodiments, detector modules 250 and 252 do not need to receive or detect emitted modulated sensor beams 254 and 256 in order to generate the appropriate reflected beam sensor signals, which can help reduce overall size and associated computation resource burdens. However, in alternative embodiments, ranging sensor assembly 200 and/or detector assemblies 250 and 252 may be modified to detect emitted modulated sensor beams 254 and 256 (e.g., according to an alternative or supplemental homodyne detector arrangement) and use such detection to help generate or refine the reflected beam sensor signals (e.g., by providing a direct reference measurement of emitted modulated sensor beams 254 and 256).

More generally, detector assemblies 250 and 252 may include or be implemented by one or more photodetectors, double sided mirrors, fiber optics, and/or other optics components, for example, and can be configured to amplify, filter, and/or provide sensor signals (e.g., generated by photodetectors 238, 240, 242, and 244) to controller 106 to determine Doppler components, generate corresponding target information, and/or perform associated processing and/or methods, as described herein.

In typical operation of the embodiment shown in FIG. 2, first reference beam 203 of first source 202, having wavelength λ1, is provided to beam splitter 206, which samples first reference beam 203 (e.g., provides a portion of beam 203 to mirror 214). The sample is reflected by mirror 214, provided to beam splitter 234, and resulting split beams are provided as reference beams (e.g., referenced to source 202) to photodetectors 238, 240. Beam splitters 206 and 234 may be implemented as 50/50 splitters or any appropriate divider splitters sufficient to provide measurable reference beams to photodetectors 238, 240 and sufficient beam amplitude to modulator assembly 217 to enable the various applications described herein.

After beam splitter 206, first reference beam 203 enters first modulator assembly 217. In first modulator assembly 217, first reference beam 203 enters modulator 218, which may be configured to modulate first reference beam 203 according to a first modulation. In some embodiments, modulator 218 may be implemented as an electro-optical modulator (EOM) configured to provide GHz range modulation of the phase, frequency, amplitude, and/or polarization of first reference beam 203, for example, Which may be used to determine a relative range estimation to a target. In one embodiment, modulator 218 may be configured to modulate first reference beam 203 such that the resulting modulated beam has a time varying primary frequency from a relatively low frequency to a relatively high frequency or a relatively high frequency to a relatively low frequency (e.g., an up-chirp or down-chirp modulation) so as to provide a more precise time measurement of the time of flight from ranging sensor assembly 200 to target 150 and back to ranging sensor assembly 200. More generally, such modulation may be according to any pattern or envelope shape, and may be linear, exponential, or otherwise a function of time of emission. Modulator 218 may be controlled by a control signal from controller 106 so that the modulation provided by modulator 218 can be adjusted as needed.

More specifically, EOMs may be incorporated into modulator assembly 217 due to their modulation rate can be much higher than those achievable by AOMs. EOM modulation may be performed via time-varying a refractive index so that phase changes in time. The modulated signal typically is not split spatially into diffraction orders with EOM, so it may be included in a modulation chain prior to an AOM. High speed modulation is essential to high modulation resolution, which may be used to reduce the uncertainty in range estimation. Numerically this can be evaluated as: $\Delta X = \Delta T \cdot c = \Delta \Omega^{-1} \cdot c$ where: $\Delta X$ is the uncertainty in range; c is the speed of light, and $\Delta \Omega$ is the modulation bandwidth, so the higher the modulation rate the smaller the range uncertainty. An EOM therefore offers advantages in this respect over an AOM. For example, a commonly available AOM typically can shift beam frequencies by ~100 MHz while commercially available EOM gives ~20 GHz.

A resulting modulated first reference beam 203 then exits modulator 218 and passes through modulator 220, which may be configured to modulate first reference beam 203 according to a second modulation. In some embodiments, modulator 220 may be implemented as an acousto-optical modulator (AOM) or Bragg cell configured to provide MHz range modulation of a deflection angle for first reference beam 203, which results in a corresponding modulation of the frequency of first reference beam 203 that is dependent on the deflection angle, all of which depends on the acoustic frequency applied to the AOM.

More specifically, an AOM typically includes a crystal with a piezo transducer coupled to it. When an RF signal is fed to the transducer it creates acoustic waves inside the crystal so a laser beam passing through sees periodic diffraction gratings and is diffracted in several orders. Additionally, acoustic vibration (phonon) energy is coupled to the light so it gets shifted in frequency (energy). An AOM can be swept so acoustic wavelength varies changing the size of the diffraction grating so the diffraction angle (e.g., the deflection angle) changes as well. In this way the resulting beam can perform a scanning motion and its frequency is shifted/changed as well. Therefore, AOMs may be used for swept modulation and for scanning.

Because modulator 220 provides MHz range modulation and modulator 218 provides GHz range modulation, the modulations do not interfere with each other, thereby allowing for more accurate target information processing (e.g., target information derived from one type of signal modulation is not degraded by the other type of signal modulation). In various embodiments, the AOM may be configured to provide fast X Y scanning (e.g., deflection of the modulated first reference beam 203 along one and/or two axes) and direction reference assigning of a target, which may be used to determine target form, size, direction, and positional coordinates, for example, based on the back-scattered frequency or bandwidth in a reflected beam. Modulator 220 may be controlled by a control signal from a controller (e.g., to control RF-driver to send a sweeping RF signal to the AOM) so that the modulation frequency of first reference beam 203 can be adjusted as needed.

More generally, modulator assembly 217 may include one or more modulators configured to provide or apply a chirp frequency modulation in a detectable range, typically at RF frequencies (e.g., 20 kHz to 300 GHz), and such one or more modulators may in various embodiments be implemented by one or more EOMs, AOMs, and/or other types of modulators.

As shown in FIG. 2, first reference beam 203 then exits modulator 220 and/or modulator assembly 217 and passes through beam splitter 210 and optical element 228, which amplifies the angle, disperses, and/or broadens first reference beam 203 as it is emitted towards a target. In some embodiments, optical element 228 may be implemented as a diverging lens, for example.

In various embodiments, the overall frequency bandwidth of the first emitted beam, which may include the MHz range modulation applied by modulator 220 (e.g., for X-Y scanning) and the GHz range modulation applied by modulator 218 (e.g., for range estimation), at time t, may be symbolized as $\Omega e1(t)$, as described herein.

A first reflected beam 246 (e.g., reflected beam 156) is returned from a target through optical element 228 (e.g., which may be configured to focus first reflected beam 246) and reflected by beam splitter 210 toward optical element 226, which may be configured to collimate first reflected beam 246. In various embodiments, optical element 226 may be implemented as a collimating lens, for example, and have a shape or effect dependent upon the shape and/or effect of optical element 228. After passing through optical element 226, first reflected beam 246 is provided to beam splitter 234, which may be configured to split first reflected beam 246 and deliver it to photodetectors 238, 240, as shown. Beam splitter 234 may be a 50/50 splitter, or any appropriate beam splitter.

In various embodiments, the overall frequency bandwidth of first reflected beam 246, which depends upon the emitted frequency bandwidth $\Omega e1(t)$ and any Doppler frequency shift $$\frac{2v}{\lambda 1}$$

(e.g., if there is relative motion), at time t may be symbolized as $\Omega r1(t)$, as described herein.

Similarly, second reference beam 205 of the second source 204, having wavelength 22, is provided to beam splitter 208, which takes a sample of second reference beam 205 (e.g., provides a portion of the beam to mirror 216). The sample of second reference beam 205 is reflected by mirror 216, provided to beam splitter 236, and subsequent split beams are provided as reference beams (e.g., referenced to source 204) to photodetectors 242, 244. Beam splitters 208 and 236 may be implemented as 50/50 splitters or any appropriate beam divider splitters sufficient to provide measurable reference beams to photodetectors 242, 244 and sufficient beam amplitude to modulator assembly 221 to enable the various applications described herein.

After beam splitter 208, second reference beam 205 enters second modulator assembly 221. As shown in FIG. 2, second reference beam 205 enters modulator 222 of second modulator assembly 221, which may be configured to provide a first modulation of second reference beam 205. In some embodiments, modulator 222 may be implemented as an EOM configured to provide GHz range modulation of the phase, frequency, amplitude, and/or polarization of second reference beam 205, for example, which may be used to determine a relative range estimation to a target. In some embodiments, modulator 222 may be configured to provide a GHz range modulation of a frequency of second reference beam 205. Modulator 222 may be controlled with a control signal from a controller so that the modulation frequency of second reference beam 205 can be adjusted as needed. Modulator 222 may be synchronized with modulator 218 such that its modulation of reference beam 205 is a function of or an equivalent of the modulation provided by modulator 218 to reference beam 203.

A resulting modulated second reference beam 205 then exits modulator 222 and passes through modulator 224, which may be configured to provide a second modulation of second reference beam 205. In some embodiments, modulator 224 may be implemented as an AOM or Bragg cell configured to provide MHz range modulation of an angle of deflection of the modulated second reference beam 205, which also results in a corresponding modulation of the frequency of the modulated second reference beam 205 that is dependent on the angle of deflection, all of which depends on the acoustic frequency applied to the AOM. In various embodiments, the AOM may be configured to provide fast X Y scanning (e.g., deflection of the modulated second reference beam 205 along one or two axes) and direction reference assigning of a target, which may be used to determine target form, size, direction, and positional coordinates, for example, based on the back-scattered frequency in a reflected beam. Modulator 224 may be controlled by a control signal from a controller (e.g., to control an RF-driver to send sweeping RF signal to the AOM) so that the modulation frequency of second reference beam 205 can be adjusted as needed. Modulator 224 may be synchronized with modulator 220 such that its modulation of reference beam 205 is a function of or an equivalent of the modulation provided by modulator 220 to reference beam 203.

More generally, as with modulator assembly 217, modulator assembly 221 may include one or more modulators configured to provide or apply a chirp frequency modulation in a detectable range, typically at RF frequencies (e.g., 20 kHz to 300 GHz), and such one or more modulators may in various embodiments be implemented by one or more EOMs, AOMs, and/or other types of modulators.

The modulated second reference beam 205 then exits modulator 224 and/or modulator assembly 221 and passes through beam splitter 212 and passes through optical element 232, which amplifies the angle, disperses, and/or broadens the modulated second reference beam 205 as it is emitted toward the target. In some embodiments, the optical element may be implemented as a diverging lens, for example.

In various embodiments, the overall frequency bandwidth of the second emitted beam, which may include the MHz range modulation applied by modulator 224 (e.g., for X-Y scanning) and the GHz range modulation applied by modulator 222 (e.g., for range estimation), at time t, may be symbolized as $\Omega e2(t)$, as described herein.

A second reflected beam 248 (e.g., reflected beam 158) is returned from a target through optical element 232 (e.g., which may be configured to focus second reflected beam 248) and reflected by beam splitter 212 toward optical element 230, which acts to collimate second reflected beam 248. In various embodiments, optical element 230 may be implemented as a collimating lens, for example, and have a shape or effect dependent upon the shape and/or effect of optical element 230. After passing through optical element 230, second reflected beam 248 is provided to beam splitter 236, which may be configured to split second reflected beam 248 and deliver it to photodetectors 242, 244, as shown. Beam splitter 236 may be a 50/50 splitter, or any appropriate beam splitter.

In various embodiments, the overall frequency bandwidth of second reflected beam 248, which depends upon the emitted frequency bandwidth $\Omega e2(t)$ and any Doppler frequency shift $$\frac{2v}{\lambda 2}$$

(e.g., if there is relative motion), at time t may be symbolized as $\Omega r2(t)$.

As noted above, photodetectors 238, 240, 242, and 244 may be configured to receive reflected beams 246 and 248 (e.g., 156/158) and provide corresponding reflected beam sensor signals to controller 106. Notably, because first reference beam 203 and second reference beam 205 emitted from first and second sources 202 and 204 have two different and substantially incoherent wavelengths $\lambda 1$ and $\lambda 2$, any Doppler components in reflected beams 246 and 248 can be identified in and/or extracted (e.g., by controller 106) from the corresponding reflected beam sensor signals generated by detector assemblies 250 and 252, because absolute Doppler shift is solely a function of wavelength. After identifying and/or extracting such Doppler components from the reflected beam sensor signals provided by detector assemblies 250 and 252, controller 106 may be configured to determine reliable and accurate target information from the Doppler components, the reflected beam sensor signals, and/or corresponding Doppler corrected reflected beam sensor signals (e.g., $\Omega r1'(t)$ and $\Omega r2'(t)$).

To illustrate the general technique, for a target having a constant relative velocity, the frequency bandwidths of emitted sensor beams 254 and 256 (e.g., corresponding to first reference beam 203 and second reference beam 205 generated by sources 202 and 204 and modulated by modulator assemblies 217 and 221) may be described as follows:

Let the overall emitted frequency bandwidth of the first and second modulated sensor beams 152 and 154, at time t, be: $\Omega e1(t)$ and $\Omega e2(t)$.

Using this formalism, the corresponding emitted bandwidths of the first and second modulated sensor beams 152 and 154 over the period of dt are:

$$\frac{d\Omega e1(t)}{dt}; \frac{d\Omega e2(t)}{dt}.$$

Using similar formalism, the received bandwidths of the first and second reflected beams 156 and 158 over the period of dt may be:

$$\frac{d\Omega r1(t)}{dt}; \frac{d\Omega r2(t)}{dt},$$

and the respective Doppler components associated with the first and second reflected beams 156 and 158 may be $$\frac{2v}{\lambda 1}; \frac{2v}{\lambda 2}.$$

Select the bandwidths of the first and second emitted beams such that they are a function of one another or an equivalent, e.g.:

$$\frac{d\Omega e1(t)}{dt}\left(\frac{d\Omega e2(t)}{dt}\right); \text{ OR } \frac{d\Omega e1(t)}{dt} = \frac{d\Omega e2(t)}{dt} = \frac{d\Omega e(t)}{dt}$$

Because the bandwidths of the first and second emitted modulated sensor beams 152 and 154 are a function of one another or equivalent (e.g., correlated), and since the first and second emitted modulated sensor beams 152 and 154 are otherwise selected to be mutually incoherent (e.g., so that the modulations are not disrupted or otherwise affected by interference between the beams), a system of 2 equations and 2 unknowns (i.e., $$\frac{d\Omega e(t)}{dt}$$

and v) can be obtained:

$$\frac{d\Omega r1}{dt} = \frac{d\Omega e}{dt} + \frac{2v}{\lambda 1} \quad (1)$$

$$\frac{d\Omega r2}{dt} = \frac{d\Omega e}{dt} + \frac{2v}{\lambda 2} \quad (2)$$

And the system of equations can be solved for the unknown values:

$$v = \frac{1}{2}\left(\frac{\lambda 1 \lambda 2}{\lambda 2 - \lambda 1}\right)\left(\frac{d\Omega r1}{dt} - \frac{d\Omega r2}{dt}\right) \quad (3)$$

$$\frac{d\Omega e}{dt} = \frac{d\Omega r1}{dt} - \left(\frac{\lambda 2}{\lambda 2 - \lambda 1}\right)\left(\frac{d\Omega r1}{dt} - \frac{d\Omega r2}{dt}\right) \quad (4)$$

In accordance with the above, based on having substantially mutually incoherent beams with two different wavelengths and correlated bandwidths (e.g., bandwidth modulations), the unknown values can be determined reliably and accurately. Thus, based on the above noted approach, controller 106 may be configured to determine the Doppler components (e.g., in the form of v or $$\frac{2v}{\lambda 1} \text{ and } \frac{2v}{\lambda 2}\right)$$

from the first and second reflected beam sensor signals, for example, and determine various target information from the Doppler components, the corresponding reflected beam sensor signals, and/or corrected reflected beam sensor signals (e.g., $\Omega r1'(t)$ and $\Omega r2'(t)$), which can be determined by subtracting the Doppler components from the results of equations (1) and (2)), such as a relative velocity between ranging sensor assembly 200 and a target, a direction to a moving target, and/or other target information.

Using the techniques described herein, reflected beam sensor signals may be used to determine a relatively precise relative position of an observed target. For example, controller 106 may process reflected beam sensor signals corresponding to reflected beams 246 and 248 to determine associated Doppler components, and then use the determined Doppler components to determine Doppler corrected reflected beam sensor signals (e.g., $\Omega r1'(t)$ and $\Omega r2'(t)$), which can then be used to determine relatively precise target information.

As noted herein, GHz-range phase, frequency, amplitude, and/or polarization modulation may be used to provide a precise range estimation to a target, and using Doppler corrected reflected beam sensor signals eliminates errors in that estimation caused by relative motion between the target and an associated multichannel ranging sensor assembly (e.g., motion generally along the direction linking the position of the ranging sensor assembly to the position of the target). Also as noted herein, MHz-range deflection angle modulation may be used to provide a precise relative direction estimation to a target (e.g., relative to an orientation of the ranging sensor assembly), and using Doppler corrected reflected beam sensor signals eliminates errors in that estimation caused by relative motion between the target and the ranging sensor assembly. Such estimations may be determined over a period of time and used to provide extremely precise relative target tracking estimations, including relative target velocities (e.g., three dimensional velocities, including components related to the determined Doppler components) for example. Moreover, related target information, including the area or silhouette pattern of a particular detected target, may be determined more accurately and thereby allow for more reliable target identification (e.g., through pattern matching, etc.)

In some embodiments, ranging sensor assembly 101 and/or 200 may be implemented with an orientation and/or positions sensor (e.g., other modules 110) configured to provide an absolute orientation and/or position of ranging sensor assembly 101 and/or 200. Controller 106 may be configured to use absolute orientations and/or positions of ranging sensor assembly 101 and/or 200, along with the precise range and relative direction estimations, to provide an extremely precise absolute position estimation of the target. Such estimations may be determined over a period of time and used to provide extremely precise absolute target tracking estimations, including absolute target velocities (e.g., three dimensional velocities, including components related to the determined Doppler components) for example.

It is understood that the scope of the present disclosure is not limited to the embodiment of FIG. 2, and, for example, the ranging sensor assembly 200 could be made with additional sensor channels, and with or without the use of fiber optic lines to couple the various elements of ranging sensor assembly 200, and embodiments within the scope of the present disclosure exist where other optical elements such as couplers, splitters, reflectors, fiber optics, gratings, mirrors, dichroic mirrors, lenses, prisms, or other optical elements are used to modulate, split, direct, combine, diffuse, focus, and/or otherwise direct or manipulate sensor and/or reflected beams. Moreover, the various elements of ranging sensor assembly may be modified to operate similarly with respect to different spectrums and forms of electromagnetic radiation. The above noted ranging sensor assembly 200 may be implemented in a compact single housing that may be carried by a user or easily mounted to a structure or alternatively may be implemented in two separate housings that may be collocated on a platform or located on separate platforms.

Figure 3:
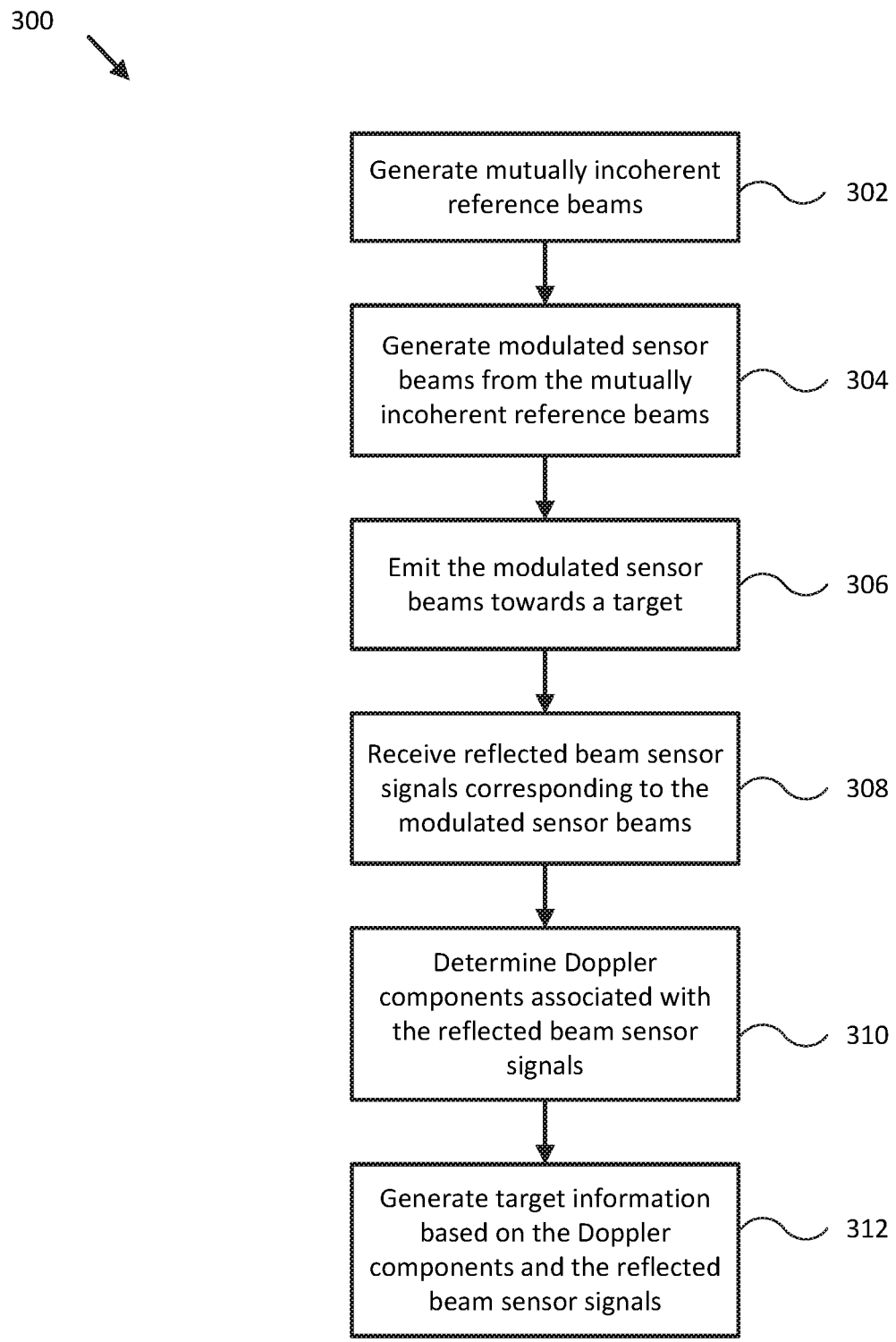
FIG. 3 illustrates a flow diagram of a remote sensing process, in accordance with an embodiment of the present disclosure.

FIG. 3 illustrates a flow diagram of a remote sensing process 300, in accordance with an embodiment of the present disclosure. For example, process 300 may be performed using embodiments of system 100 of FIG. 1 and ranging sensor assembly 200 of FIG. 2. At the initiation of process 300, various system parameters may be populated by prior execution of a process similar to process 300, for example, or may be initialized to zero and/or one or more values corresponding to typical, stored, and/or learned values derived from past operation of process 300, as described herein.

In block 302, mutually incoherent reference beams are generated. For example, controller 106 may be configured to use sources 202 and 204 in sensor channels 200A and 200B of ranging sensor assembly 200 to generate mutually incoherent reference beams 203 and 205, where first source 202 and second source 204 generate first reference beam 203 having wavelength $\lambda 1$ and second reference beam 205 having wavelength $\lambda 2$, respectively. In various embodiments, first and second reference beams 203 and 205 are substantially incoherent with respect to each other, such that wavelengths $\lambda 1$ and $\lambda 2$ are sufficiently different that reference beams 203 and 205 do not measurably interfere with each other, as measured by detector assemblies 250 and 252 of ranging sensor assembly 200.

In block 304, modulated sensor beams are generated. For example, controller 106 may be configured to use modulators 218, 220, 222, and/or 224 of modulator assemblies 217 and 221 in sensor channels 200A and 200B of ranging sensor assembly 200 to generate modulated sensor beams 254 and 256 from mutually incoherent reference beams 203 and 205 generated in block 302. In various embodiments, modulators within first modulator assembly 217 and second modulator assembly 221 may be synchronized with each other such that the modulations performed by a modulator of one modulator assembly is a function of or equivalent to the modulations performed by a modulator of the other modulator assembly, such that the modulator assemblies for each sensor channel provide correlated modulations of corresponding reference beams (e.g., mutually incoherent reference beams 203 and 205). The overall frequency bandwidth of the generated modulated sensor beams 254 and 256, at time t, may be symbolized as $\Omega e1(t)$ and $\Omega e2(t)$, respectively, and may include a MHz range modulation for X-Y direction determination and a GHz range modulation for distance determination, as described herein.

In some embodiments, first modulator assembly 217 includes first modulator 218 configured as an EOM and second modulator 220 configured as an AOM and second modulator assembly 221 includes first modulator 222 configured as an EOM and second modulator 224 configured as an AOM. For example, first modulators 218, 222 may be configured as EOMs operable to provide GHz range frequency modulations, and second modulators 220, 224 may be configured as AOMs operable to provide MHz range deflection angle and/or deflection-angle-related frequency modulations, as described herein. The EOM frequency modulations may be configured to facilitate range detection to a target, and the AOM angle deflection modulations may be configured to provide sensor beams with their frequency modulated based on the angle of deflection, which may be used to determine relative angle to a target and/or coordinates of a target, as described herein.

In some embodiments, the first modulators 218, 222 may be EOMs configured to provide substantially equivalent frequency modulations for the first and second reference beams 203, 205 and the second modulators 220, 224 may be AOMs configured to provide substantially correlated and/or non-equivalent deflection angle modulations for the first and second reference beams 203, 205. In other embodiments, first modulators 218, 222 may be EOMs configured to provide substantially, correlated and/or non-equivalent frequency modulations for first and second reference beams 203, 205, and second modulators 220, 224 may be AOMs configured to provide substantially equivalent deflection angle modulations for first and second reference beams 203, 205.

As noted herein, mutually incoherent reference beams 203 and 205 may be modulated such that the resulting modulated sensor beams 254 and 256 are mutually incoherent with respect to each other, even if the applied modulations are themselves correlated to each other (e.g., equivalent or functionally related to each other, as described herein). As such, modulated sensor beams 254 and 256 may be referred to herein as modulated sensor beams that are correlated to each other and mutually incoherent with respect to each other.

In block 306, modulated sensor beams are emitted. For example, controller 106 may be configured to use various elements of sensor channels 200A and 200B of ranging sensor assembly 200 to emit modulated sensor beams 254 and 256 from sensor channels 200A and 200B towards target 150. Optical elements 228 and 232 of sensor channels 200A and 200B may be lenses configured to amplify (e.g., widen) the dispersion angles of the first and second modulated sensor beams 254 and 256 as they are emitted toward the target. In various embodiments, sensor channels 200A and 200B and/or ranging sensor assembly 200 may be articulated and/or include actuators and/or actuated optical elements controllable by controller 106 to illuminate a target substantially as it moves relative to ranging sensor assembly 200 and/or remote sensing system 100.

In block 308, reflected beam sensor signals are received. For example, controller 106 may be configured to receive reflected beam sensor signals from detector assemblies 250 and 252 in sensor channels 200A and 200B of ranging sensor assembly 200, corresponding to modulated sensor beams 254 and 256 emitted in block 306 and reflected from target 150 as reflected beams 246 and 248. In some embodiments, detector assembly 250 may include photodetectors 238 and 240 disposed in a first balanced and/or homodyne detection arrangement, and detector assembly 252 may include photodetectors 242 and 244 disposed in a second balanced and/or homodyne detection arrangement. In some embodiments, first and second reflected beams 246, 248 produce amplitude modulations with reference beams 203, 205, respectively, as shown in FIG. 2, corresponding, to coherent interference. In such embodiments, each detection arrangement may act upon a corresponding reference beam and reflected beam to split and mix the beams to determine a frequency bandwidth of the reflected beam (e.g., two dimensional plot of frequency deviation).

In block 310, Doppler components are determined. For example, controller 106 may be configured to determine Doppler components associated with reflected beams 246 and 248 based, at least in part, on the reflected beam sensor signals received in block 308. In embodiments where target 150 is moving relative to ranging sensor assembly 200, first and second reflected beams 246, 248 include respective Doppler components. In such embodiments, the overall frequency bandwidth $\Omega r1(t)$ of first reflected beam 246, at time t, includes components corresponding to the bandwidth $\Omega e1(t)$ of first emitted beam 254 and a corresponding Doppler shift. Similarly, the overall frequency bandwidth $\Omega r2(t)$ of second reflected beam 248, at time t, includes components corresponding to the bandwidth $\Omega e2(t)$ of second emitted beam 256 and a corresponding Doppler shift, as described herein. A system of equations and unknowns may be formed and solved, using the reflected beam sensor signals received in block 308, the known modulations selected and applied to mutually incoherent reference beams 203, 205 in block 304, and the different frequencies of mutually incoherent reference beams 203, 205 selected and generated in block 302, to determine the Doppler components, as described more fully herein.

In block 312, target information is generated. For example, controller 106 may be configured to generate target information (e.g., relative and/or absolute target position, angular direction to target, velocity and/or acceleration of target, range to target, cross sectional area and/or centroid of target, target orientation, and/or associated imagery) based, at least in part, on the Doppler components determined in block 310 and the reflected beam sensor signals received in block 308. In some embodiments, controller 106 may be configured to process the first and second reflected beam sensor signals to identify and/or extract their respective Doppler components and to generate various types of target information, including position and direction to target, velocity of target, and associated imagery. In related embodiments, controller 106 may be configured to compare reflected beam sensor signals with previously received sensor signals to determine additional target information, such as a target track and/or orientation statistics.

In other embodiments, controller 106 may be configured to receive an absolute orientation and/or position of ranging sensor assembly 200 (e.g., from an orientation and/or position sensor—other modules 110—integrated with ranging sensor assembly 200 and/or remote sensing system 100) and to generate corresponding absolute coordinates or other target information, including imagery, associated with a detected target.

Controller 106 may also be configured to receive a desired orientation, position, and/or angular frequency (e.g., an absolute angular frequency, as opposed to relative to platform 112, so as to compensate for motion of platform 112) for ranging sensor assembly 200, as user input provided to user interface 108 for example, and be configured to control a corresponding actuator (e.g., other modules 110) to adjust an orientation and/or position of ranging sensor assembly 200 while operating remote sensing system 100. In one embodiment, controller 106 may be configured to control the actuator to rotate ranging sensor assembly 200 according to a desired angular frequency relative to an absolute coordinate frame using orientation and/or position information provided by corresponding sensors (e.g., a GNSS receiver, a magnetometer capable of measuring Magnetic North, and/or a compass—other modules 110).

In various embodiments, controller 106 may be configured to calibrate and/or align various orientation and/or position sensors of other modules 110 by receiving reflected beam sensor signals and corresponding orientations and/or positions of ranging sensor assembly 200 and/or platform 112 and calibrating the sensors according to known positions of detected targets, such as those provided by a nautical chart or other maps and charts. As such, in some embodiments, controller 106 may be configured to calibrate and/or align one or more measurement coordinate frames with respect to an absolute coordinate frame using the reflected beam sensor signals and/or orientation and/or position information. Such calibration processes may occur substantially in parallel with various portions of process 300.

In further embodiments, controller 106 may be configured to render target information for display to a user via a display of user interface 108. In some embodiments, the rendered target information may be referenced to an absolute coordinate frame (e.g., North-up) and/or a coordinate frame of the platform (e.g., course-up), such as in a navigational chart or map. Target information acquired and/or processed in blocks 302-310 may be used to control operation of platform 112, such as by controlling a steering actuator, and/or a propulsion system to steer platform 112 according to a desired direction, which may be selected to evade or acquire a detected target.

It is contemplated that one or a combination of blocks 302-310 may be performed according to one or more operating contexts of a control loop, for example, such as a startup, learning, running, and/or other type operating context. For example, process 300 may proceed back to block 302 and proceed through process 300 again to produce updated target information and/or associated imagery, as in a control loop.

Embodiments of the present disclosure can thus provide reliable and precise remote sensing data, associated imagery, and other target information. Such target information may be used to provide imagery to assist in navigation for a mobile structure, to survey or monitor a body of water and/or an area of land, and/or to assist in the operation of other systems, devices, and/or sensors, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the present disclosure is defined only by the following claims.

What is claimed is:

1. A system comprising:
a ranging sensor assembly comprising first and second sensor channels configured to emit respective first and second modulated sensor beams towards a target and to detect corresponding respective first and second reflected beams reflected from the target, wherein the first and second modulated sensor beams are selected to be correlated to each other and mutually incoherent with respect to each other; and a controller configured to communicate with the ranging sensor assembly, wherein the controller is configured to:
receive first and second reflected beam sensor signals corresponding to the detected first and second reflected beams;
determine Doppler shifts associated with the first and second reflected beams based at least on the first and second reflected beam sensor signals; and
generate target information based at least on the determined Doppler shifts.

2. The system of claim 1, wherein:
the first and second sensor channels comprise respective first and second acousto-optical modulators (AOMs) configured to modulate respective first and second deflection angles of the first and second modulated sensor beams.

3. The system of claim 1, wherein:
the first and second sensor channels comprise respective first and second electro-optical modulators (EOMs) configured to modulate respective first and second frequencies of the first and second modulated sensor beams.

4. The system of claim 1, wherein:
the first and second sensor channels comprise respective first and second acousto-optical modulators (AOMs) configured to modulate respective first and second deflection angles of the first and second modulated sensor beams to provide substantially correlated non-equivalent deflection angle modulations for the respective first and second modulated sensor beams; and
the first and second sensor channels comprise respective first and second electro-optical modulators (EOMs) configured to modulate respective first and second frequencies of the first and second modulated sensor beams to provide substantially equivalent frequency modulations for the respective first and second modulated sensor beams.

5. The system of claim 1, wherein:
the first and/or second sensor channels comprise respective first and/or second balanced homodyne detection modules configured to receive the first and/or second reflected beams and convert them into the corresponding first and/or second reflected beam sensor signals.

6. The system of claim 1, wherein:
the first and second sensor channels comprise respective first and second lasers configured to generate respective first and second reference beams corresponding to the respective first and second modulated sensor beams.

7. The system of claim 6, wherein the first and second lasers are polarized gas lasers.

8. The system of claim 1, wherein:
the remote sensor assembly comprises an orientation and/or position sensor configured to provide an orientation and/or position of the remote sensor assembly; and
the generating the target information is based at least on the determined Doppler shifts, the received first and second reflected beam sensor signals, and the orientation and/or position of the remote sensor assembly.

9. The system of claim 1, further comprising a display, wherein the controller is configured to render at least a portion of the generated target information using the display.

10. The system of claim 1, further comprising an actuator coupled to the ranging sensor assembly and configured to adjust an orientation of the ranging sensor assembly.

11. The system of claim 1, wherein the target information comprises a relative velocity, a relative position, a range, an absolute velocity, and/or an absolute position of the target.

12. A method comprising:
receiving, from a ranging sensor assembly comprising first and second sensor channels configured to emit respective first and second modulated sensor beams towards a target and to detect corresponding respective first and second reflected beams reflected from the target, first and second reflected beam sensor signals corresponding to the first and second reflected beams reflected from the target;
determining Doppler shifts associated with the first and second reflected beams based at least on the first and second reflected beam sensor signals; and
generating target information based at least on the Doppler shifts and the received first and second reflected beam sensor signals;
wherein the first and second modulated sensor beams are selected to be correlated to each other and mutually incoherent with respect to each other.

13. The method of claim 12, wherein the remote sensor assembly comprises an orientation sensor configured to provide an orientation of the remote sensor assembly, the method further comprising:
receiving the orientation of the remote sensor assembly from the orientation sensor; and
generating the target information based at least on the Doppler shifts, the received first and second reflected beam sensor signals, and the orientation of the remote sensor assembly.

14. The method of claim 12, further comprising generating the first and second modulated sensor beams by:
modulating respective first and second frequencies of the first and second modulated sensor beams using corresponding first and second electro-optical modulators (EOMs).

15. The method of claim 12, further comprising generating the first and second modulated sensor beams by:
modulating respective first and second deflection angles of first and second source beams using corresponding first and second acousto-optical modulators (AOMs).

16. The method of claim 12, further comprising generating the first and second modulated sensor beams by:
modulating respective first and second frequencies of the first and second modulated sensor beams using corresponding first and second electro-optical modulators (EOMs) to provide substantially correlated non-equivalent frequency modulations for the respective first and second modulated sensor beams; and
modulating respective first and second deflection angles of first and second modulated sensor beams to provide substantially equivalent deflection angle modulations for the respective first and second modulated sensor beams.

17. The method of claim 16, further comprising:
determining a relative range to the target based at least on the modulated frequencies provided by the first and second EOMs; and
determining a relative orientation to the target based at least on the modulated deflection angles provided by the AOMs.

18. The method of claim 12, further comprising:
rendering at least a portion of the generated target information on a display.

19. The method of claim 12, further comprising:
controlling an actuator to adjust an orientation of the ranging sensor assembly.

20. The method of claim 12, wherein the target information comprises a relative velocity, a relative position, a range, an absolute velocity, and/or an absolute position of the target.

* * * * *

UNITED STATES PATENT AND TRADEMARK OFFICE
CERTIFICATE OF CORRECTION

PATENT NO. : 11,573,305 B2
APPLICATION NO. : 16/686391
DATED : February 7, 2023
INVENTOR(S) : Artem Kryvobok It is certified that error appears in the above-identified patent and that said Letters Patent is hereby corrected as shown below:

In the Specification

In the Detailed Description:

Column 12, Line 52, change ““for example, Which may be” to --for example, which may be--.

Column 14, Line 40, change "having wavelength 22, is provided" to --having wavelength λ2, is provided--.

Signed and Sealed this
Eleventh Day of April, 2023

Katherine Kelly Vidal
*Director of the United States Patent and Trademark Office*